United States Patent
Ogawa et al.

(10) Patent No.: US 10,882,529 B2
(45) Date of Patent: Jan. 5, 2021

(54) CONTROL METHOD OF VEHICLE, AND CONTROL DEVICE OF THE VEHICLE

(71) Applicant: Nissan Motor Co., Ltd., Yokohama (JP)

(72) Inventors: Katsuyoshi Ogawa, Kanagawa (JP); Atsuhiro Mori, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/633,038

(22) PCT Filed: Aug. 16, 2017

(86) PCT No.: PCT/JP2017/029457
§ 371 (c)(1),
(2) Date: Jan. 22, 2020

(87) PCT Pub. No.: WO2019/035188
PCT Pub. Date: Feb. 21, 2019

(65) Prior Publication Data
US 2020/0231155 A1    Jul. 23, 2020

(51) Int. Cl.
*B60W 30/188*    (2012.01)
*B60W 40/068*    (2012.01)
*B60K 17/348*    (2006.01)
*B60W 40/105*    (2012.01)
*B60W 50/00*    (2006.01)
*G01N 19/02*    (2006.01)

(52) U.S. Cl.
CPC ......... *B60W 30/188* (2013.01); *B60K 17/348* (2013.01); *B60W 40/068* (2013.01)

(58) Field of Classification Search
CPC ............ B60W 30/188; B60W 40/068; B60W 2520/105; B60W 2520/14; B60W 2520/125; B60W 2520/28; B60W 2520/266; B60W 2050/0021; B60W 2050/0051; B60W 40/105; B60W 2720/403; B60K 17/348; G01N 19/02
See application file for complete search history.

(56) References Cited

U.S. PATENT DOCUMENTS

| | | | |
|---|---|---|---|
| 5,419,624 A * | 5/1995 | Adler | B60T 8/175 303/112 |
| 6,357,840 B1 | 3/2002 | Atkins | |
| 6,418,369 B2 * | 7/2002 | Matsumoto | B60T 8/172 180/197 |

(Continued)

FOREIGN PATENT DOCUMENTS

| | | |
|---|---|---|
| CN | 103241127 A | 8/2013 |
| CN | 105291885 A | 2/2016 |

(Continued)

*Primary Examiner* — Tinh Dang
(74) *Attorney, Agent, or Firm* — Global IP Counselors, LLP

(57) ABSTRACT

A vehicle control device includes sensors that detect pulse signals corresponding to rotation of front wheels and of rear wheels of a vehicle, and a controller that increases a count at a rise and a fall of the pulse signals. The controller estimates a road surface friction coefficient based on a time rate of change of a difference between a value counted up using the front wheels and a value counted up using the rear wheels.

5 Claims, 5 Drawing Sheets

(56) References Cited

U.S. PATENT DOCUMENTS

| | | | | |
|---|---|---|---|---|
| 7,234,339 B2* | 6/2007 | Kogure | ............... | B60W 40/068 |
| | | | | 73/9 |
| 7,702,446 B2* | 4/2010 | Hiwatashi | ........... | B60W 40/064 |
| | | | | 701/80 |
| 2002/0124629 A1 | 9/2002 | Hurson | | |

FOREIGN PATENT DOCUMENTS

| | | | |
|---|---|---|---|
| JP | 2007-30692 | A | 2/2007 |
| JP | 2009-248633 | A | 10/2009 |
| JP | 2017-87786 | A | 5/2017 |
| WO | 99/00279 | A1 | 1/1999 |

\* cited by examiner

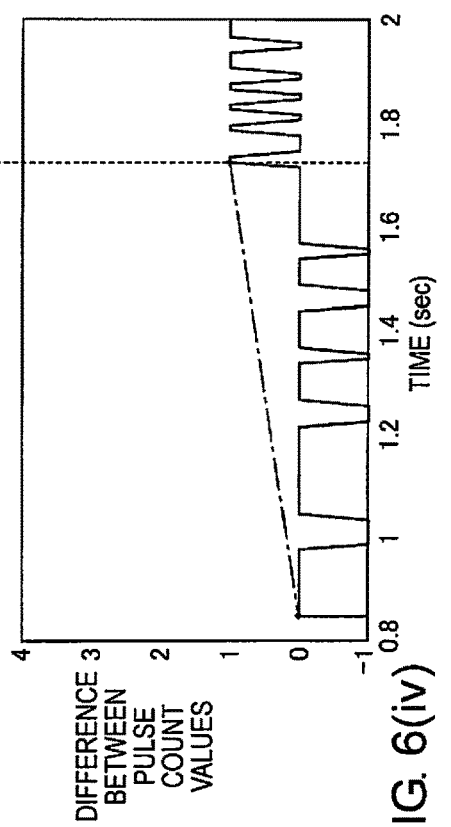
FIG. 6(iii)

CONTROL METHOD OF VEHICLE, AND CONTROL DEVICE OF THE VEHICLE

CROSS-REFERENCE TO RELATED APPLICATIONS

This application is a U.S. national stage application of International Application No. PCT/JP2017/029457, filed on Aug. 16, 2017.

BACKGROUND

Technical Field

The present invention relates to a vehicle control method and a vehicle control device that estimate a road surface friction coefficient.

Background Information

Japanese Laid-Open Patent Application No. 2017-87786 (Patent Document 1) discloses a technique in which a slip ratio is calculated based on wheel speed and a road surface friction coefficient is estimated based on the relationship between the slip ratio and driving force that acts on the wheels.

SUMMARY

In general, a wheel speed sensor filters a pulsed signal generated in accordance with the rotation of a wheel to convert the pulsed signal into a wheel speed signal. Therefore, in the technique of Patent Document 1, there is the problem that if the wheel speed signal is used when calculating the slip ratio, information is lost due to the filtering process, so that minute slip states cannot be detected, and the road surface friction coefficient cannot be estimated with high precision.

An object of the present invention is to provide a vehicle control method and a vehicle control device that can precisely estimate the coefficient of friction of the road surface.

In order to achieve the object described above, in the present invention, a count is increased at a rise and fall of a pulse signal corresponding to the rotation of front wheels and of rear wheels of a vehicle, and the road surface friction coefficient is estimated based on the time rate of change of the difference between a value counted up using the front wheels and a value counted up using the rear wheels.

Therefore, since a pulse signal is used instead of a wheel speed signal which has lost information, it is possible to detect minute slip states and to estimate the road surface friction coefficient with high precision.

DETAILED DESCRIPTION OF THE EMBODIMENTS

A preferred embodiments for carrying out a vehicle control method and a vehicle control device of the present invention is described below based on the drawings.

First Embodiment

Figure 1:
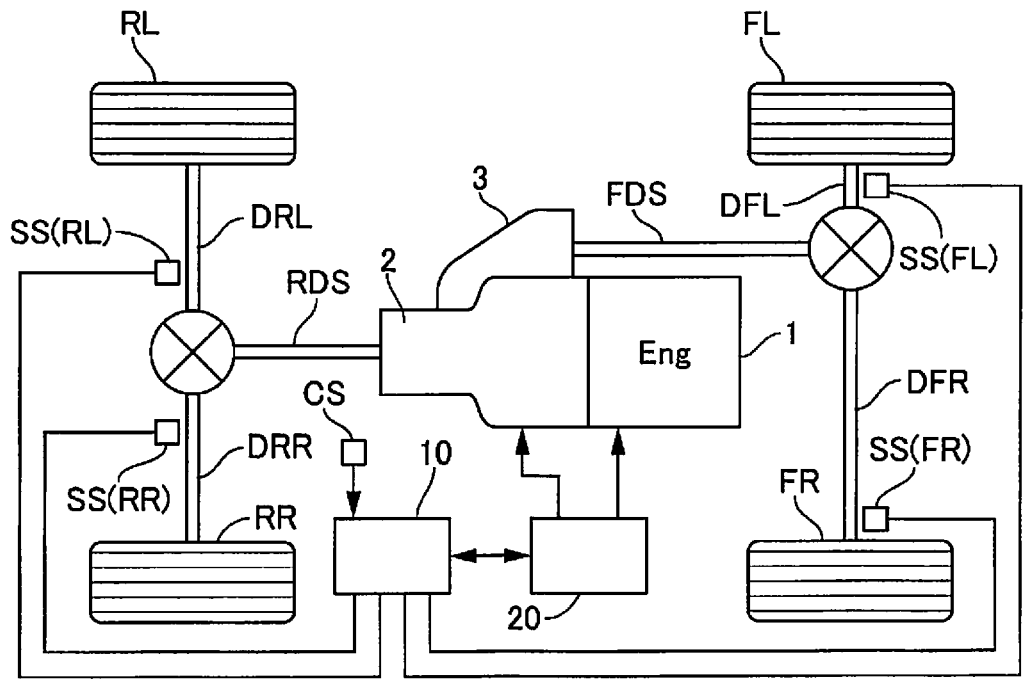
FIG. 1 is a system diagram of a vehicle according to a first embodiment.

FIG. 1 is a system diagram of a vehicle according to a first embodiment. The vehicle of the first embodiment is a rear-wheel drive based four-wheel drive vehicle. The vehicle comprises an engine 1, an automatic transmission 2, and a transfer 3. The automatic transmission 2 changes the rotational speed of the engine 1 and outputs part or all of the torque that is output from the engine 1 from a rear drive shaft RDS. The torque output from the rear drive shaft RDS is transmitted to rear wheels RL, RR (hereinafter also simply referred to as rear wheels.) via a rear left wheel drive shaft DRL and a rear right wheel drive shaft DRR. In addition, the transfer 3 outputs part of the torque that is output from the engine 1 from a front drive shaft FDS. The torque output from the front drive shaft FDS is transmitted to front wheels FL, FR (hereinafter also simply referred to as front wheels) via the front left wheel drive shaft DFL and a front right wheel drive shaft DFR.

The vehicle has a wheel speed sensor SS (FL, FR, RL, RR) that detects the rotational state of each wheel FL, FR, RL, RR, and an integrated sensor CS that detects the longitudinal acceleration Gx, the lateral acceleration Gy, and the yaw rate Yaw of the vehicle. A brake controller 10 receives a sensor signal (pulse signal) of the wheel speed sensor SS and calculates a wheel speed Vw and a vehicle body speed Vx. Details of the wheel speed sensor SS will be described further below. In addition, various sensor signals (Gx, Gy, Yaw) are received from the integrated sensor CS.

The brake controller 10 executes anti-lock brake control (hereinafter referred to as ABS.) which suppresses the locking tendency of wheels, vehicle dynamics control (hereinafter referred to as VDC) which stabilizes vehicle behavior, automatic brake control based on a brake request received from an automatic driving controller, which is not shown, and the like, based on received sensor signals and calculated information, to control the state of the brake, which is not shown.

The controller 20 has an engine control unit that controls the operating state of the engine 1, a transmission control unit that controls the shifting state of the automatic transmission 2, and a driving force distribution control unit that controls the driving force distribution state of the transfer 3. The engine control unit controls the torque and the rotational speed of the engine 1 by means of throttle opening degree, fuel injection amount, plug ignition timing, and the like. The transmission control unit determines the optimum gear shift stage based on the vehicle speed VSP and the accelerator opening degree APO, and shifts to the selected gear shift stage by means of hydraulic control in the automatic transmission 2. The driving force distribution control unit calculates the driving force to be distributed to the front wheels and the driving force to be distributed to the rear wheels, and controls the torque to be transmitted from the transfer 3 to the front wheels, based on the state of travel of the vehicle.

The brake controller 10 and the controller 20 are connected via a CAN communication line. The controller 20 receives, from the brake controller 10, pulse signals of the wheel speed sensor SS, and data such as the wheel speed Vw, the vehicle body speed Vx, the longitudinal acceleration Gx, the lateral acceleration Gy, and the yaw rate Yaw. The brake controller 10 receives, from the controller 20, data such as engine torque information, the gear shift stage, and the driving force distribution state.

Figure 2:
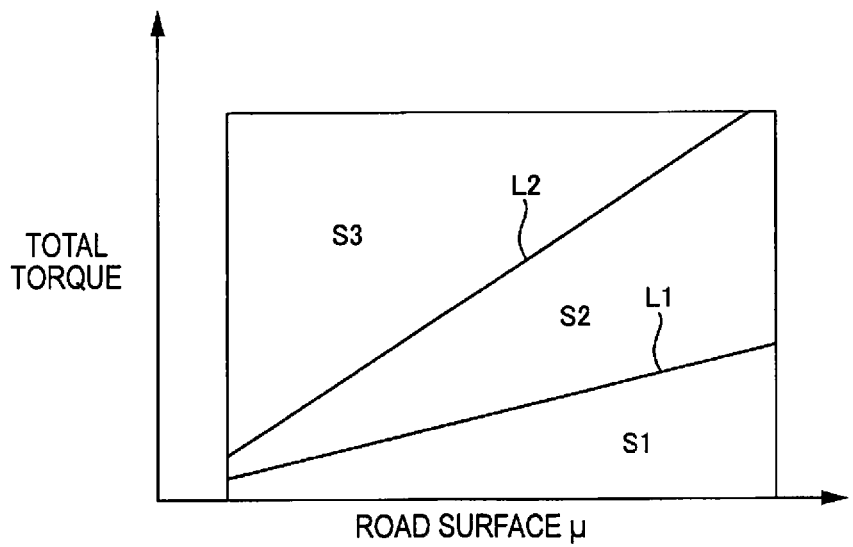
FIG. 2 is a control map of a vehicle driving force distribution control according to the first embodiment.

FIG. 2 is a control map of the vehicle driving force distribution control according to the first embodiment. The horizontal axis is the road surface friction coefficient (hereinafter referred to as road surface μ) and the vertical axis is the total torque of the front drive shaft FDS and the rear drive shaft RDS. The threshold value L1 in FIG. 2 represents the maximum value of the torque that the rear wheels can transmit to the road surface, and the threshold value L2 represents the maximum value of the torque that can be transmitted to the road surface from both the front wheels and the rear wheels. A region S1 below the threshold value L1 in FIG. 2 is a region in which the vehicle travels by means of rear-wheel drive. The characteristic of the threshold value L1 is such that the value of L1 is small when the road surface μ is low, and the value of L1 is large when the road surface μ is high. A region S2 above the threshold value L1 and below the threshold value L2 in FIG. 2 is a region in which the vehicle travels by means of four-wheel drive. Of the torque output from the engine 1, the driving force distribution control unit distributes L1 to the rear wheels and the remaining torque to the front wheels.

A region S3 above the threshold value L2 in FIG. 2 is a region in which the vehicle travels by means of four-wheel drive and requests torque reduction to the engine 1. The region S3 represents that excess torque is output from the engine 1 even if, of the torque output from the engine 1, L1 is distributed to the rear wheels and the difference between L2 and L1 is distributed to the front wheels. In this case, the driving force distribution control unit requests, with respect to the engine 1, a torque reduction corresponding to the amount of torque obtained by subtracting L2 from the engine torque.

Figure 3:
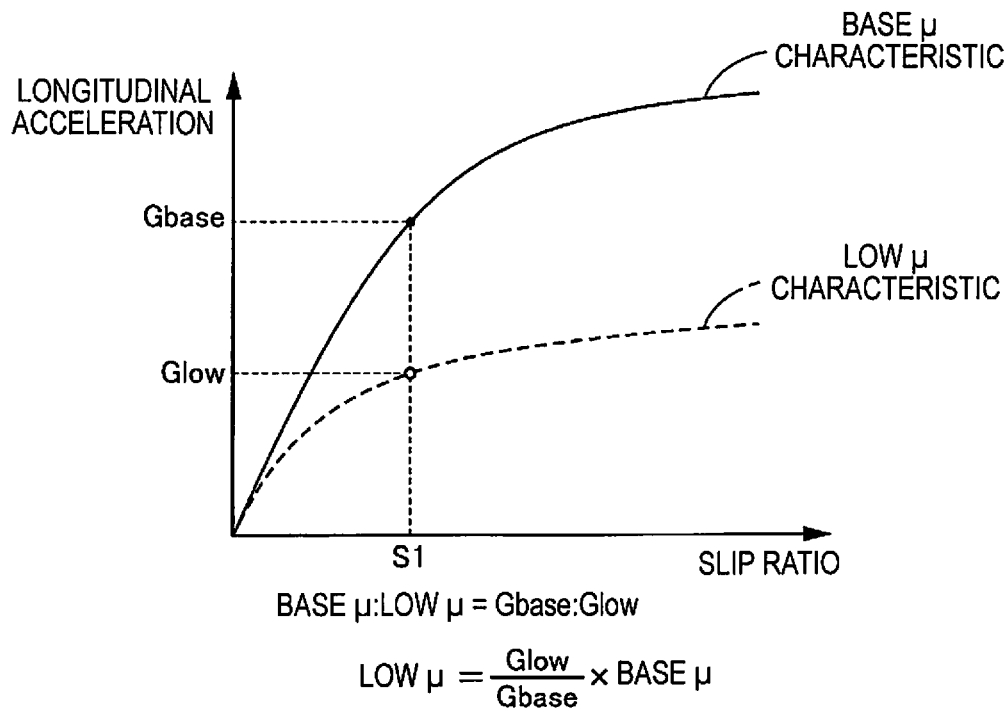
FIG. 3 is a characteristic diagram showing a road surface μ estimation method according to the first embodiment.

FIG. 3 is a characteristic diagram showing a road surface μ estimation method according to the first embodiment. In this characteristic diagram, the horizontal axis is the slip ratio of the wheels and the vertical axis is the longitudinal acceleration. The base μ obtained by measuring the characteristics on a high μ road in advance through experiment, or the like. The road surface μ representing the base μ characteristic is assumed to be "1." Here, it is known that the road surface μ and the longitudinal acceleration have a linear relationship at an arbitrary slip ratio. Therefore, where the base longitudinal acceleration, which is the longitudinal acceleration that is generated with the base μ characteristic at a certain slip ratio S1, is Gbase, and the longitudinal acceleration at a low μ is Glow, the following relationship is established.

Base μ:low μ=Gbase:Glow

Therefore, it is represented as

Low μμ=(Glow/Gbase)×base μ

Since the base μ is 1, the low μ is represented by the ratio of Glow with respect to the base longitudinal acceleration Gbase. From the foregoing, if the a highly precise slip ratio can be calculated, the road surface μ can be estimated with high precision.

As illustrated in FIG. 2, in the vehicle according to the first embodiment, when carrying out the driving force distribution control, the road surface μ is used. This is because there is a correlation with the force that can be transmitted to the road surface from the wheels. The vehicle according to the first embodiment comprises a pulse μ estimation processing unit that carries out estimation using pulse signals of the wheel speed sensor SS, and a wheel speed μ estimation processing unit that carries out estimation using the wheel speed Vw calculated from the wheel speed sensor SS, when estimating the road surface μ.

Regarding the Wheel Speed μ Estimation Process

The brake controller 10, when receiving a pulse signal from the wheel speed sensor SS, calculates a first wheel speed based on the number of pulse signals included per unit time. Then, the first wheel speed is filtered from the standpoint of noise removal to calculate a stable wheel speed Vw. Subsequently, the vehicle body speed Vx is calculated from the wheel speed Vw calculated for each wheel. The vehicle body speed Vx is carried out by, for example, selecting the low Vw of the wheels or selecting the lower of average front wheel speed Vwf-ave and average rear wheel speed Vwr-ave. In addition, the detected longitudinal acceleration Gx can be used to carry out a correction, or the like. Then, a wheel speed base slip ratio Svw is calculated by dividing the wheel speed Vw by the vehicle body speed Vx. Next, from a base μ characteristic shown in FIG. 3, the base longitudinal acceleration Gbase at the wheel speed base slip ratio Svw is calculated, and a current longitudinal acceleration Gcur is divided by the base longitudinal acceleration Gbase to calculate a wheel speed base road surface friction coefficient μVw. Here, the current longitudinal acceleration Gcur may be the longitudinal acceleration Gx detected by the integrated sensor CS, or the rate of change dVx/dt of the vehicle body speed Vx can be used.

Figure 4:
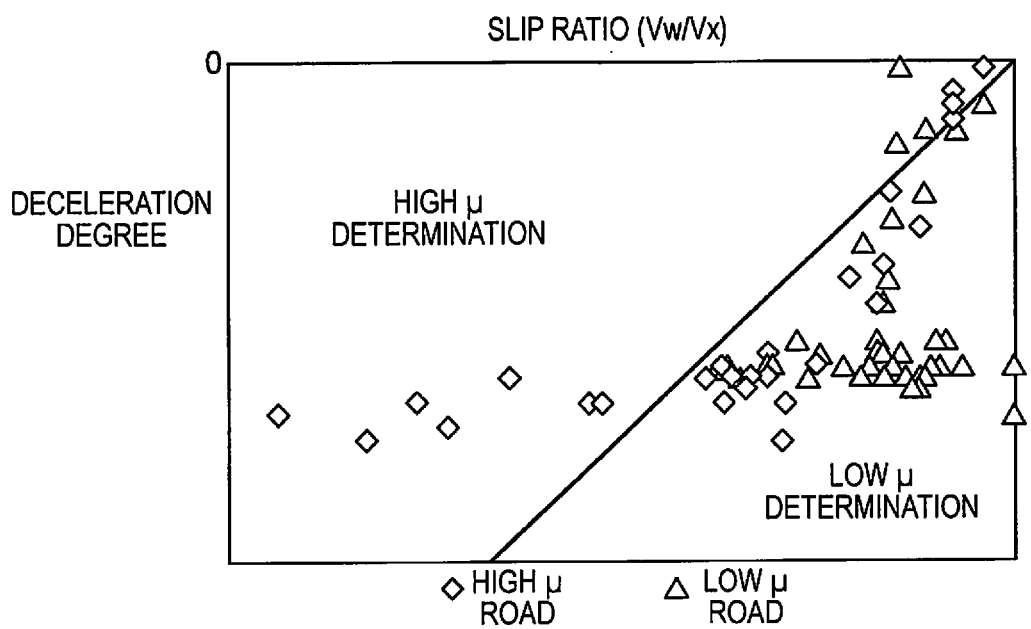
FIG. 4 is the result of experiments in which the relationships between actual slip ratio and deceleration are plotted for each of a high μ road and a low μ road.

FIG. 4 shows the experimentally derived relationship between the actual slip ratio and deceleration plotted for a high μ road and a low μ road. The high μ determination region in FIG. 4 is a region in which the deceleration relative to the slip ratio is large, and represents a region in which the driving force distribution control unit can determine high μ for control. The low μ determination region in FIG. 4 is a region in which the deceleration relative to the slip ratio is small, and represents a region in which the driving force distribution control unit can determine low μ for control. Here, the experimental results when actually traveling a high μ road are plotted using ▲, and the experimental results when actually traveling a low μ road are plotted using ♦. The high μ road experimental results ▲ mostly appear in the high μ determination region, and it can be seen that there are few examples of erroneous determination as a low μ road. In contrast, in the low μ road experimental results, there are many ♦ plotted in the high μ determination region, so that it can be understood that there are many examples of erroneous determination as a high μ road. As described above, this is thought to be because, when the wheel speed Vw is used, information relating to minute slip states are lost as a result of the filtering process, etc., especially at the beginning of slipping. Therefore, the present inventors decided to estimate the road surface μ, not from the wheel speed Vw output from the brake controller 10, but by receiving pulse signals of the wheel speed sensor SS from the brake controller 10 before information is lost.

Regarding the Pulse μ Estimation Process

Figure 5:
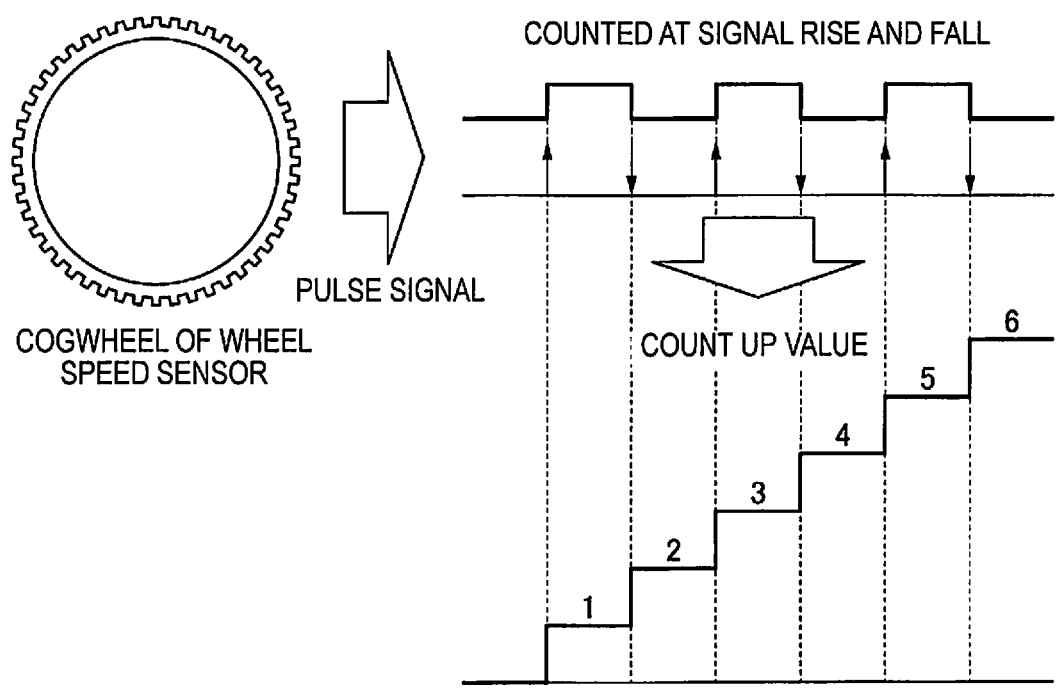
FIG. 5 is a schematic view showing a configuration of a wheel speed sensor according to the first embodiment.

FIG. 5 is a schematic view showing a configuration of the wheel speed sensor according to the first embodiment. As illustrated in FIG. 5, the wheel speed sensor SS has a cogwheel that rotates integrally with the wheel and forms pulse signals based on changes in the impedance due to changes in unevenness of the cogwheel. At this time, a value obtained by counting up the rise and fall of the pulse signal (hereinafter referred to as pulse count value) is used.

Figure 6I:
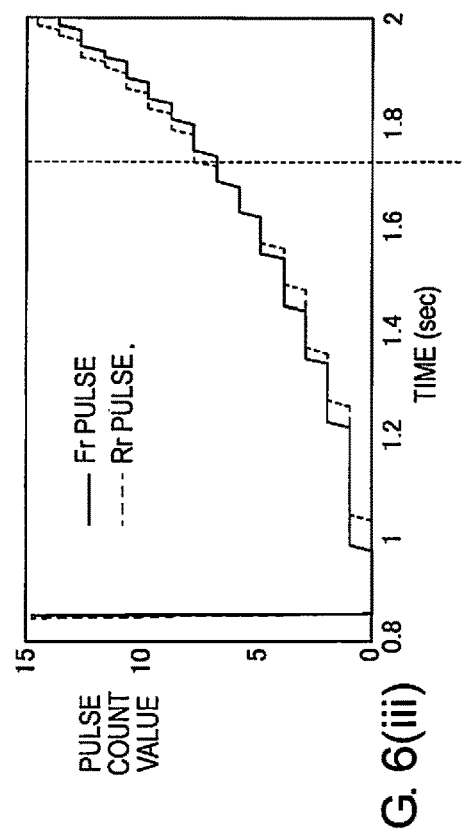
FIG. 6 is a view showing the relationship of count values of pulse signals detected by the wheel speed sensor according to the first embodiment.
Figure 6:
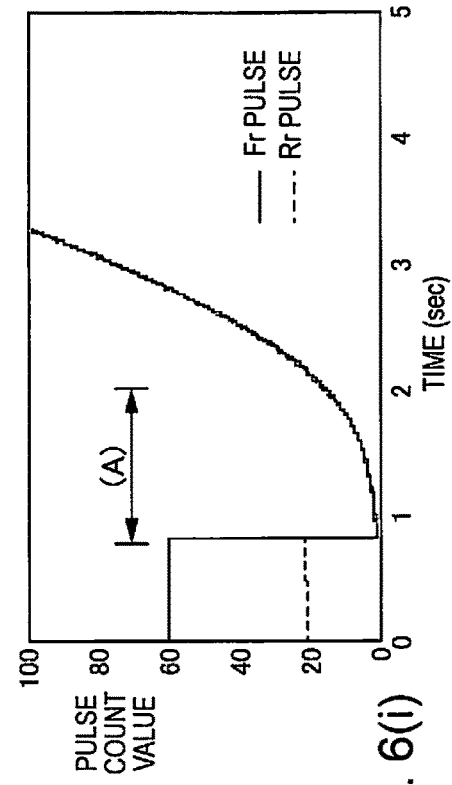
Figure 6:
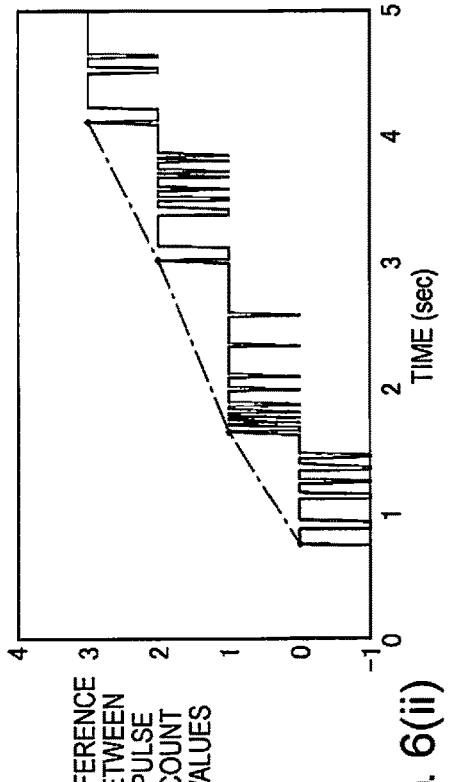

FIG. 6 is a view showing the relationship of count values of pulse signals detected by the wheel speed sensor according to the first embodiment. FIG. 6(*i*) shows the relationship between the pulse count value for the front left wheel and the pulse count value for the rear left wheel. FIG. 6(*ii*) shows the difference between the pulse count values of FIG. 6(*i*) (rear left wheel pulse count value−front left wheel pulse count value). In addition, FIG. 6(*iii*) is an enlarged view of section (A) in FIG. 6(*i*), and FIG. 6(*iv*) is an enlarged view of section (A) in FIG. 6(*ii*). The resetting of the pulse count value at the start of section (A) indicates that the driver has depressed the brake pedal and started to decelerate. Since this occurs during deceleration due to depression of the brake pedal, the wheel speed on the front wheel side tends to decrease. This is because, since the load moves to the front wheel side during deceleration, a vehicle is generally set to have a large brake capacity on the front wheel side.

As illustrated in FIG. 5, regarding the cogwheel of the wheel speed sensor SS, each wheel is rotating independently, and the unevenness of the cogwheel of the wheel speed sensor SS of each wheel are not necessarily synchronized. Therefore, when starting to count up, the difference between the initial pulse count values becomes 0 or −1. Then, when the rotational speed on the front wheel side decreases earlier than the rotational speed on the rear wheel side, and the count-up speed of the front wheel pulse count value decreases, the difference between the pulse count values becomes 1. In other words, the moment that the difference between the pulse count values becomes 1 indicates the moment when the unevenness of the cogwheel of the wheel speed sensor SS of the front wheel and the unevenness of the cogwheel of the wheel speed sensor SS of the rear wheel are synchronized. Therefore, time measurement is started at the timing at which the difference between the pulse count values indicates 1.

Then, the time tx it takes for the difference to change by 1, such as the time it takes for the difference between the pulse count values to change from 1 to 2, or from 2 to 3, is measured. "The change from 1 to 2 of the difference in the pulse count" means that the cogwheel of the wheel speed sensor SS of the rear wheel rotates by two teeth while the cogwheel of the wheel speed sensor SS of the front wheel rotates by one tooth. Therefore, a relative speed ΔVpuls between the front wheels and the rear wheels can be calculated from the number of teeth of the wheel speed sensor SS, the difference between the pulse count values, and the time tx. The rear wheel speed at the initial stage of braking can be substantially regarded as being the vehicle body speed Vx, since the slip between the rear wheels and the road surface is extremely small. If the rear wheel speed is Vwr, the front wheel speed is Vwf, and the slip ratio of the front wheels due to the pulse μ estimation process is Spuls:

$$Vwf = Vwr - \Delta Vpuls$$

$$Spuls = (Vwr - Vwf)/Vx$$

$$Vwr = Vx$$

Therefore, it is represented as $$Spuls = \Delta Vpuls/Vwr$$

In the first embodiment, the time tx until the difference between the pulse count values becomes 3 is calculated, and Spuls is calculated at this point in time. As a result, even if the pulse signals are used directly, it is possible to suppress the influence of noise, etc., and to calculate a stable slip ratio Spuls. The road surface μ estimation shown in FIG. 3 is carried out using this highly precise slip ratio Spuls.

As described above, by calculating the slip ratio Spuls based on the difference between the pulse count values, the slip ratio was successfully calculated with high precision, even in very small slip regions. That is, when calculating the slip ratio using the wheel speed Vw, it is possible to precisely calculate the slip ratio when the slip ratio increases and the force that acts between the wheels and the road surface is near the maximum value. However, at the beginning of slipping (very small slip region) before the force that acts between the wheels and the road surface reaches the maximum value, information is lost in the process of the noise being removed, so that it is difficult to precisely calculate the slip ratio.

However, by directly using the pulse signals of the wheel speed sensor SS and calculating the slip ratio Spuls based on the time rate of change of the difference between the pulse count values of the front and rear wheels, it was found that the minute slips immediately after the start of slipping can be precisely calculated. In fact, when the experiment shown in FIG. 5 was carried out using the slip ratio Spuls, erroneous determination was successfully eliminated by almost 100%. Therefore, a stable state of travel can be realized by using a pulse base road surface friction coefficient μpuls estimated by using Spuls to carry out the driving force distribution control.

In the first embodiment, when estimating the road surface μ, a left side pulse base road surface friction coefficient μpuls_L using the pulse signals of the front left wheel and the pulse signals of the rear left wheel, and a right side pulse base road surface friction coefficient μpuls_R using the pulse signals of the front right wheel and the pulse signals of the rear right wheel, are respectively calculated. As a result, it is possible to detect a so-called split μ road, in which the road surface friction coefficient is different between the left and right wheels.

Figure 7:
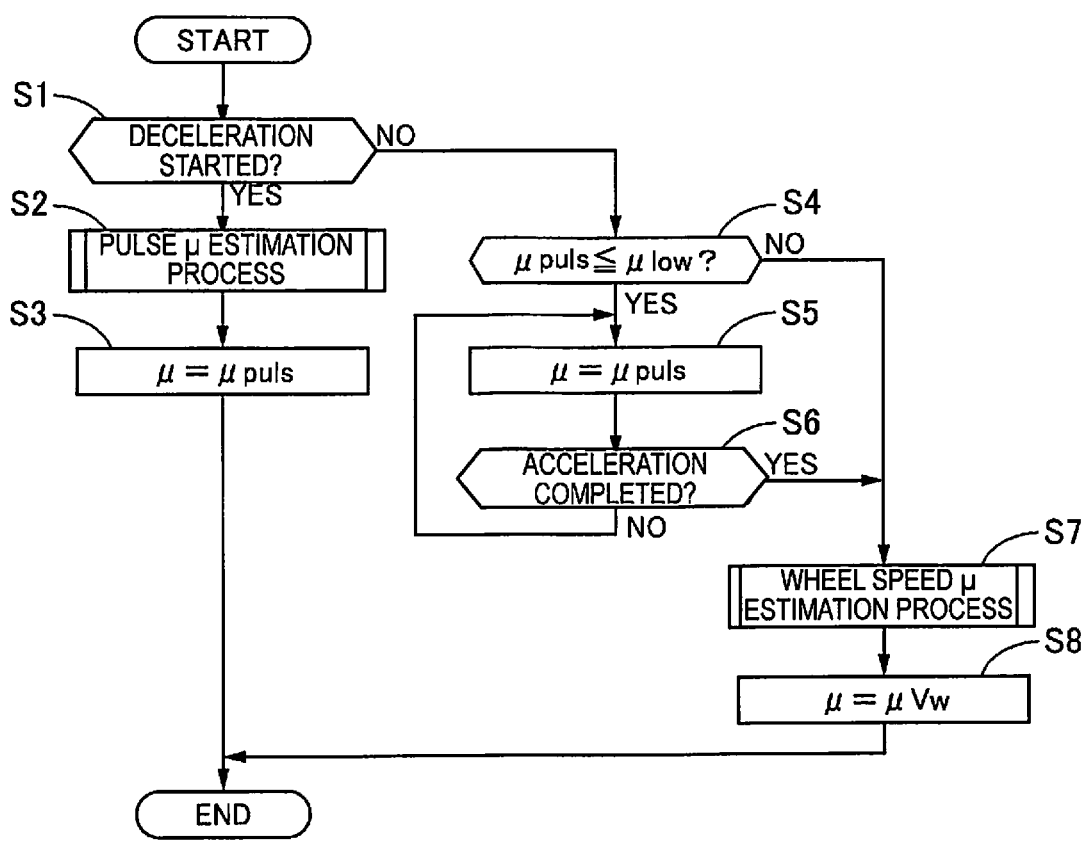
FIG. 7 is a flow chart showing a road surface friction coefficient estimation process according to the first embodiment.

FIG. 7 is a flow chart showing the road surface friction coefficient estimation process according to the first embodiment.

In Step S1, it is determined whether deceleration has started; if it is determined that deceleration has started, the process proceeds to Step S2, and otherwise, the process proceeds to Step S4. Here, whether deceleration has started can be detected by various methods, such as whether a brake switch has tuned ON, or whether an engine braking force is being applied as a result of the driver operating the shift lever and down shifting in the manual mode.

In Step S2, the pulse μ estimation process is carried out. Details of the pulse μ estimation process is as described above.

In Step S3, the pulse base road surface friction coefficient μpuls is set as the road surface μ.

In Step S4, it is determined whether the pulse base road surface friction coefficient μpuls is less than or equal to a prescribed value μlow indicating a low μ; if it is determined to be less than or equal to the prescribed value, the process proceeds to Step S5, and the pulse base road surface friction coefficient μputs continues to be used. Then, the process proceeds to Step S6, and it is determined whether acceleration has completed; if acceleration has completed, the process proceeds to Step S7, and otherwise, the process proceeds to Step S5. This is because, if a low μ road is determined during deceleration, a stable vehicle behavior can be realized without the distribution of excess torque when starting the driving force distribution control, by continuing the use of the pulse base road surface friction coefficient μpuls even during acceleration.

In Step S7, the wheel speed μ estimation process is carried out, and in Step S8, a wheel speed base road surface friction coefficient μVw is used as the road surface μ. Details of the wheel speed μ estimation process is as described above. That is, if a high μ road is determined, even if a relatively large slip ratio occurs, it is possible to effectively transmit torque from the wheels to the road surface. In addition, in the pulse μ estimation process, Spuls cannot be calculated until the difference between the pulse count values becomes 3, but the wheel speed Vw and the vehicle body speed Vx are data from which noise immediately obtained from the brake controller 10 has been removed. Therefore, it is possible to execute torque distribution in accordance with the road surface condition.

As described above, the effects listed below are exhibited with the first embodiment.

(1) A count is increased at a rise and fall of a pulse signal corresponding to rotation of front wheels and of rear wheels of a vehicle, and a pulse base road surface friction coefficient μpuls is estimated based on the time rate of change of the difference between a value counted up using the front wheels and a value counted up using the rear wheels. Therefore, since a pulse signal is used instead of a wheel speed signal which has lost information, it is possible to detect minute slip states, and to estimate the road surface friction coefficient with high precision.

(2) When distributing the driving force of the engine 1 to the front wheels and the rear wheels based on the road surface friction coefficient, the distribution of the driving force to the front wheels and the rear wheels is carried out based on a pulse base road surface friction coefficient μpuls during re-acceleration of the vehicle, when the pulse base road surface friction coefficient μpuls estimated during deceleration of the vehicle is less than or equal to μlow (low friction coefficient). Therefore, when starting the driving force distribution control during acceleration, a stable vehicle behavior can be realized without the distribution of excess torque.

(3) The wheel speed Vw is calculated based on the number of pulse signals per unit time, the wheel speed base road surface friction coefficient μVw (second road surface friction coefficient) is estimated based on the wheel speed Vw, and when distributing the driving force of the engine 1 to the front wheels and the rear wheels based on the road surface friction coefficient, the distribution of the driving force to the front wheels and the rear wheels is carried out based on the wheel speed base road surface friction coefficient μVw during re-acceleration of the vehicle, when the pulse base road surface friction coefficient μpuls estimated during deceleration of the vehicle is greater than μlow. That is, if a high μ road is determined, even if a relatively large slip ratio occurs, it is possible to effectively transmit torque from the wheels to the road surface. In addition, in the pulse μ estimation process, Spuls cannot be calculated until the difference between the pulse count values becomes 3, but the wheel speed Vw and the vehicle body speed Vx are data from which noise immediately obtained from the brake controller 10 has been removed. Therefore, it is possible to execute torque distribution in accordance with the road surface condition.

(4) When estimating the pulse base road surface friction coefficient μpuls, a right side road surface friction coefficient μpuls_R is estimated based on the time rate of change of the difference between a value counted up using the front right wheel and a value counted up using the rear right wheel, and a left side road surface friction coefficient μpuls_L is estimated based on the time rate of change of the difference between a value counted up using the front left wheel and a value counted up using the rear left wheel. Therefore, it is possible to detect a split μ road in which the road surface friction coefficient is different between the left and right wheels, and to stably control the vehicle.

OTHER EMBODIMENTS

The present invention was described above based on the embodiments, but the specific configuration may be another configuration. In the first embodiment, an example was presented in which the invention is applied to a rear-wheel drive based four-wheel drive vehicle, but the invention can also be applied to a front-wheel drive based four-wheel drive vehicle. In addition, in the first embodiment, an example was presented in which the pulse base road surface friction coefficient μpuls is estimated during deceleration, but the pulse base road surface friction coefficient μputs may be estimated during acceleration as well. Additionally, in the first embodiment, both the pulse base road surface friction coefficient μpuls and the wheel speed base road surface friction coefficient μVw are estimated, and the road surface friction coefficient to be used is selected in accordance with the situation, but the pulse base road surface friction coefficient μpuls may always be used. In addition, in the first embodiment, the road surface friction coefficient to be used when carrying out a driving force distribution control is estimated, but a road surface friction coefficient to be used when carrying out other braking control or turning control may be estimated as well.

The invention claimed is:

1. A vehicle control method comprising:
  detecting pulse signals corresponding to rotation of front wheels and of rear wheels of a vehicle,
  increasing a count at a rise and fall of the pulse signals,
  estimating a road surface friction coefficient based on a time rate of change of a difference between a value counted up using the front wheels and a value counted up using the rear wheels, and
  controlling at least one of a braking of the vehicle, a turning of the vehicle and a distribution of driving force to the front wheels and the rear wheels of the vehicle based on the estimated road surface friction coefficient.

2. The vehicle control method according to claim 1, wherein
  when distributing the driving force of a power source to the front wheels and the rear wheels based on the road surface friction coefficient and when the road surface friction coefficient estimated during deceleration of the vehicle is a low friction coefficient, the driving force is distributed to the front wheels and the rear wheels based on the low friction coefficient during re-acceleration of the vehicle.

3. The vehicle control method according to claim 1, wherein
  a wheel speed is calculated based on a number of the pulse signals per unit time, a second road surface friction coefficient is estimated based on the wheel speed, and when distributing the driving force of a power source to the front wheels and the rear wheels based on the road surface friction coefficient and when the road surface friction coefficient estimated during deceleration of the vehicle is a high friction coefficient, the driving force is distributed to the front wheels and the rear wheels based on the second friction coefficient during re-acceleration of the vehicle.

4. The vehicle control method according to claim 1, wherein when estimating the road surface friction coefficient, a right side road surface friction coefficient is estimated based on a time rate of change of a difference between a value counted up using a front right wheel and a value counted up using a rear right wheel, and a left side road surface friction coefficient is estimated based on a time rate of change of a difference between a value counted up using a front left wheel and a value counted up using a rear left wheel.

5. A vehicle control device comprising:

sensors that output pulse signals corresponding to rotation of front wheels and of rear wheels of a vehicle, and a controller configured to: increase a count at a rise and a fall of the pulse signals; estimate a road surface friction coefficient based on a time rate of change of a difference between a value counted up using the front wheels and a value counted up using the rear wheels; and control at least one of a braking of the vehicle, a turning of the vehicle and a distribution of driving force to the front wheels and the rear wheels of the vehicle based on the estimated road surface friction coefficient.

\* \* \* \* \*